(12) United States Patent
Kaye et al.

(10) Patent No.: US 10,977,724 B1
(45) Date of Patent: Apr. 13, 2021

(54) REAL ESTATE PRIVATE INDEX FUND SYSTEMS AND METHODS

(71) Applicant: Investors Diversified Realty, LLC, Cleveland, OH (US)

(72) Inventors: Joshua Andrew Kaye, Richmond Heights, OH (US); Garrett Edward Zdolshek, Broadview Heights, OH (US)

(73) Assignee: Investors Diversified Realty, LLC, Cleveland, OH (US)

( * ) Notice: Subject to any disclaimer, the term of this patent is extended or adjusted under 35 U.S.C. 154(b) by 1181 days.

(21) Appl. No.: 14/316,918

(22) Filed: Jun. 27, 2014

Related U.S. Application Data

(60) Provisional application No. 61/839,988, filed on Jun. 27, 2013.

(51) Int. Cl.
*G06Q 40/00* (2012.01)

(52) U.S. Cl.
CPC .................................... *G06Q 40/00* (2013.01)

(58) Field of Classification Search
None
See application file for complete search history.

(56) References Cited

U.S. PATENT DOCUMENTS

| | | | | |
|---|---|---|---|---|
| 8,117,108 B2 * | 2/2012 | Johnson | ............... | G06Q 40/025 705/37 |
| 8,131,621 B1 * | 3/2012 | Gastineau | .............. | G06Q 40/04 705/36 R |
| 8,180,697 B2 | 5/2012 | Frischer | | |
| 8,260,704 B1 | 9/2012 | Hung et al. | | |
| 8,271,371 B2 | 9/2012 | Noma | | |
| 8,296,207 B2 | 10/2012 | Case et al. | | |
| 8,694,402 B2 * | 4/2014 | Arnott | .................... | G06Q 40/06 705/35 |
| 8,712,797 B1 | 4/2014 | Bezdek et al. | | |
| 8,751,355 B2 | 6/2014 | Rossi et al. | | |
| 2002/0091623 A1 | 7/2002 | Daniels | | |
| 2005/0015326 A1 | 1/2005 | Terry | | |
| 2005/0216384 A1 | 9/2005 | Partlow et al. | | |
| 2009/0043713 A1 * | 2/2009 | Weber | .................... | G06Q 40/06 705/36 R |
| 2010/0228661 A1 * | 9/2010 | Lutnick | .................. | G06Q 40/04 705/37 |
| 2012/0310816 A1 * | 12/2012 | Noma | .................... | G06Q 40/04 705/37 |
| 2014/0122371 A1 | 5/2014 | Sood | | |

OTHER PUBLICATIONS

Tracking Error and the Efficient Frontier. Nov. 1, 2007. Web. Feb. 10, 2021. <https://www.etf.com/publications/journalofindexes/joi-articles/3223.html?nopaging=1>. (Year: 2007).*

* cited by examiner

*Primary Examiner* — Kito R Robinson
*Assistant Examiner* — Shacole C Tibljas
(74) *Attorney, Agent, or Firm* — RatnerPrestia

(57) ABSTRACT

Systems and methods for creating and administering and a real estate private index fund as a single investable instrument which tracks a non-investable real estate index of open-ended funds with minimal tracking error.

12 Claims, 4 Drawing Sheets

Redemption Process A

Step A1

Monitor Investor Redemptions

Step A2
Review Index Fund Contribution & Redemption Needs

Entry Queue → Step A3 Create Segregation Account

No Queue → Rebalance

Exit Queue → Follow Component Fund Process

Redemption Process B

Step B1

Manage Component Fund Queue Database

Step B2
Review Component Fund Contribution & Redemption Needs

No Queue → Step B3 Rebalance

Exit Queue → Create Segregation Account

REAL ESTATE PRIVATE INDEX FUND SYSTEMS AND METHODS

RELATED APPLICATIONS

This application is related to U.S. Provisional Application No. 61/839,988, filed Jun. 27, 2013.

FIELD OF THE INVENTION

The present disclosure and related inventions pertain generally to computer-implemented systems and methods for providing novel investment opportunities, and more specifically to investments related to indexing private real estate investments and investments in private real estate funds.

BACKGROUND

There are a number of non-investable private real estate indices which are published by organizations such as IPD, NCREIF, NAREIT and PREA. These indices track and report on the aggregate performance of individual private open-ended real estate investment funds, referred to herein as "Component Funds". Component Funds are available to qualified investors for investment on an individual basis. A single instrument that weights the Component Funds with respect to their percentage of the index and adjusts the weightings based on market value changes does not exist.

Component Funds are generally valued on a quarterly basis, however, rebalancing is not limited to a quarterly basis if indexes or Component Funds report more often than quarterly. Component Funds may have investment queues of investors seeking to enter or exit the fund. The queues limit the ability of an investor to rebalance in a timely fashion given the lag the queues may create for entering or exiting the Component Fund.

Over the past 10 years, the creation of real estate indices has become a prominent topic as industry professionals and investors are seeking a benchmark that is more reflective of their investment strategy. The private real estate industry, prior to 2005, had primarily relied on the National Council of Real Estate Investment Fiduciaries ("NCREIF") NCREIF Property Index ("NPI"). The NPI was comprised of real estate assets owned by large pension funds in their separate accounts, as well as the large open end core equity real estate fund managers. The NPI was unleveraged and provided a good relative proxy of how various property types and regions performed over various time periods. However, the NPI methodology and tracking of actual investment performance had several major shortcomings for investors. First, the NPI was not investible, whereby investors would be incapable of replicating the index performance since such a large percentage of the investment universe was held in single investor accounts. Secondly, the mix of investments tracked by the NPI involved lower risk profiles than some of the real estate investments owned by investors. Lastly, the NPI tracked unleveraged real estate returns, which was inconsistent with the leverage profile of many real estate investors.

Beginning in the early 2000's, NCREIF and Investment Property Databank ("IPD") have been developing and working on creating various investment indices for real estate investors. IPD began producing the first global private real estate indices that tracked investment performance that could be analyzed by country and region. NCREIF began two separate fund ventures: NCREIF Fund Indices that are compiled and created by NCREIF and their member firms ("NFI"), and others that are compiled and created by Townsend ("NCREIF/Townsend"). The first NFI index was the Open End Diversified Core Equity Index ("NFI ODCE"). The NFI ODCE was compiled with historical and exiting funds that met the definitions of a core equity fund. All of the above-mentioned indices were not investable.

Despite the fundamental improvements in benchmarks and indices, private real estate has never had an investable index product such as many other assets classes, (e.g., stocks, bonds, and commodities which all have indexing funds). As such, private real estate investors have had to hold specific investments which have provided tracking error versus the index whose return they are seeking to attain. To date, the difficulty of having an investable index has been related to a number of factors including, (i) the amount of investment capital required to invest in each Component Fund is significant, (ii) entrance and withdrawal queues for Component Funds, and (iii) rebalancing an investment that provides limited liquidity (e.g., quarterly). There are currently no investable "beta" strategies or index products private real estate investment.

Index funds have been growing significantly as an investment option. During 2012, according to Morningstar, passive products (index funds) have captured over 41% of net capital flows in the public markets. The same report also shows that index funds currently control 18.3% of the mutual fund market. Investor preference for a market rate of return appears to be part of a growing and continuing investor trend.

Index funds by nature aim to replicate the movements of an index of a specific financial market regardless of market conditions. While these types of products are readily available for liquid investment securities, such as stocks and bonds, alternative products, such as private real estate or private equity, do not provide investors index product offerings. Certain investment vehicles, particularly open-end funds, however, provide the ability to create an investible investment index in private real estate by an actively managed investment vehicle.

Component Funds offer the most liquid investment alternative in private real estate. Component Funds allow for quarterly entrance (contribution) and exits (redemption). Much of this is due to the valuation of the investments. Component Funds are required to mark their funds to market on a quarterly basis and receive third party appraisals on an annual basis. These values are accounted for in a Net Asset Value ("NAV"), which is provided to investors quarterly and is the basis for investor entrance and exit values of a Component Fund. The NAV is calculated by adding capital contributions, subtracting distributions, adding in earned income, realized appreciation, and unrealized appreciation, while subtracting fund expenses and management fees. These NAV's provide a reasonable basis for giving investors quarterly liquidity. Component Funds may also have cash holdings that could be utilized to facilitate the entrance and withdrawals of investors on a quarterly basis.

Generally, the most liquid private real estate indices, that are only investable on a single Component Fund basis, are the NFI-ODCE, and the IPD/PREA U.S. Property Fund Index—Core Diversified Open End Funds. The Component Funds that report to these indices offer quarterly liquidity and provide transparency in their reporting processes. In addition to reporting transparency, quarterly liquidity provides the ability to weight investment positions to be substantially similar to those in the index.

Transparent valuation of an investment provides a current and verifiable price for subscriptions and redemptions, and gives investment advisors and their clients the most up-to-date information available regarding the value of a fund such as a real estate investment fund or a real estate private index fund as disclosed herein. Typically, the current value of a "share" of a Component Fund is calculated by summing up the net values of all the fund's holdings and dividing that result by the number of outstanding shares to arrive at a "net asset value per share," "per share NAV" or simply an "NAV." The per share NAV is then used as the price at which investors may buy into a fund, or, alternatively, the price at which they can redeem their shares. In conventional mutual funds, calculating an NAV is fairly straightforward when the funds comprise readily-priced assets. However, calculating an NAV for a fund that holds commercial real estate assets is much harder, as there is no market with listed securities type liquidity for the assets.

SUMMARY OF THE INVENTION

The real estate private index fund (also referred to herein as "private index fund" or "index fund") of the present disclosure, and related systems and methods, provides an investable instrument for replicating or tracking the performance of a real estate index by rebalancing the weightings of the Component Funds of an index based on quarterly market values. The real estate private index fund provides additional liquidity above the Component Funds liquidity given that investors can enter and exit the real estate private index fund similar to a Component Fund, and allows investors the ability to generate market rate returns with minimal variance from index returns.

Features and aspects of the real estate private index fund include but are not limited to the ability to manage the limited liquidity of the Component Funds through rebalancing using reinvestment of dividends, a cash buffer which has minimal effect on return yet provides flexibility for queues, and weighting optimization of key factors which affects performance such as property type and geographic weightings, leverage and property occupancy.

The real estate private index fund of the disclosure also provides investors the ability to track the Component Funds and ultimately the index return within a specified range of tracking error, and provides a market value for transfer of interests based on Component Fund valuations on a quarterly basis.

Various and preferred embodiments of the systems and methods of the disclosure provide investment products as well as techniques and supporting systems for creating, offering and managing real estate private index funds. By use of the systems and methods of the present disclosure, investors, as well as advisors on behalf of their clients, may allocate capital to institutional grade commercial real estate investments through a quarterly valued investment vehicle that offers quarterly purchases and quarterly redemptions but that is not actively traded on any open market. The real estate private index fund provides the benefits to investors of greater diversification and reduced volatility of real estate investment, and the relative illiquidity of real estate offerings is substantially increased and managed by the real estate private index fund structure designed to provide greater liquidity through quarterly valuations, purchases and redemptions. The relative lack of transparency in valuation of commercial real estate products is substantially eliminated by the systems and methods of the present disclosure and by the novel detailed valuation methodology and use of independent valuation expertise in connection with "rolling" valuations of real estate and real estate-related assets and liabilities of the Component Funds. The methodology of the present disclosure accommodates use by individual investors as well as investment advisors in ongoing portfolio allocation strategies, rather than for one-time acquisition of a Component Fund. Typical ongoing usage events include portfolio rebalancing, systematic investments, and systematic withdrawals as further described.

In order to manage the quarterly pricing, redemption and contribution requirements of investments in the real estate private index fund, the processes and systems described herein enable and facilitate the periodic assessment of the value of real estate assets held by the Component Funds. These values are combined with valuations of the liquid assets (securities, cash) held by Component Funds along with daily expense accruals and used to calculate an overall net asset value (NAV). In order to manage redemptions and contributions, the liquidity of the real estate private index fund holdings is managed and monitored and as redemptions and contributions are received and a "market condition" is established. Based upon market condition, a redemption or contribution cap may be purely discretionary, or, in some cases, calculated (either using a fixed value or a formula, subjective elements, or a combination of each). In each case, the redemption cap is applied as a limit (in dollars, shares or both) to the amount an investor may redeem or contribute during any one period. Also, the redemption cap may be applied to part or all of the real estate private index fund, if necessary or desired.

Therefore, in one aspect, a computer-implemented system and method for creating and pricing shares of an open-ended, unlisted real estate private index fund includes a system for executing contributions and distributions and a detailed process for executable instructions. Executing the instructions results in the implementation of an appraisal or valuation module that facilitates the determination of real estate pricing data based on a periodic appraisal of illiquid or generally illiquid real estate assets held in the real estate investment vehicle and a pricing module that combines the real estate pricing data with pricing data related to liquid securities held by the real estate investment index and accrued expenses, resulting in a net asset value NAV of the real estate private index fund. Preferably, the systems and methods of the disclosure do not dilute or unbalance positions in the real estate private index fund.

In another aspect a computer-implemented method for redeeming shares of an open-ended, unlisted real estate investment private index fund includes providing electronic access to an applications server on which computer-based reallocation models are stored and that, when executed by an active portfolio manager, facilitates the pricing and managed redemption and contributions of the real estate investment private index fund and the Component Funds. The pricing, redemption and contribution of the fund includes calculating real estate pricing data based on a periodic appraisal of illiquid or generally illiquid real estate assets held by Component Funds and combining the real estate pricing data held by the Component Funds and accrued expenses, resulting in a real estate private index fund net asset value (NAV).

In some embodiments, one or more adjustments or variables may be applied to the real estate pricing data between periodic appraisals, and an adjusted net asset value of the real estate private index fund is calculated based on the real estate appraisal data. A per share net asset value of the real estate private index fund may then be calculated based on the total net asset value and number of outstanding shares.

The present disclosure and related inventions also includes novel systems and methods for receipt and processing of redemption and contribution orders for a real estate private index fund. As redemption or contribution orders are received, a redemption or contribution segregation account is created, and the redemption or contribution orders are processed according to the redemption or contribution cap of Component Funds. Redemptions and contributions may be made quarterly in accordance with the investment restrictions of the Component Funds. Moreover, in some embodiments, pre-redemption compliance testing may be incorporated to ensure compliance with certain federal income tax law restrictions regarding dividend equivalent redemptions.

These and other features and aspects of the disclosure and related inventions are further described herein with reference to the accompanying drawings.

DETAILED DESCRIPTION

Figure 1:
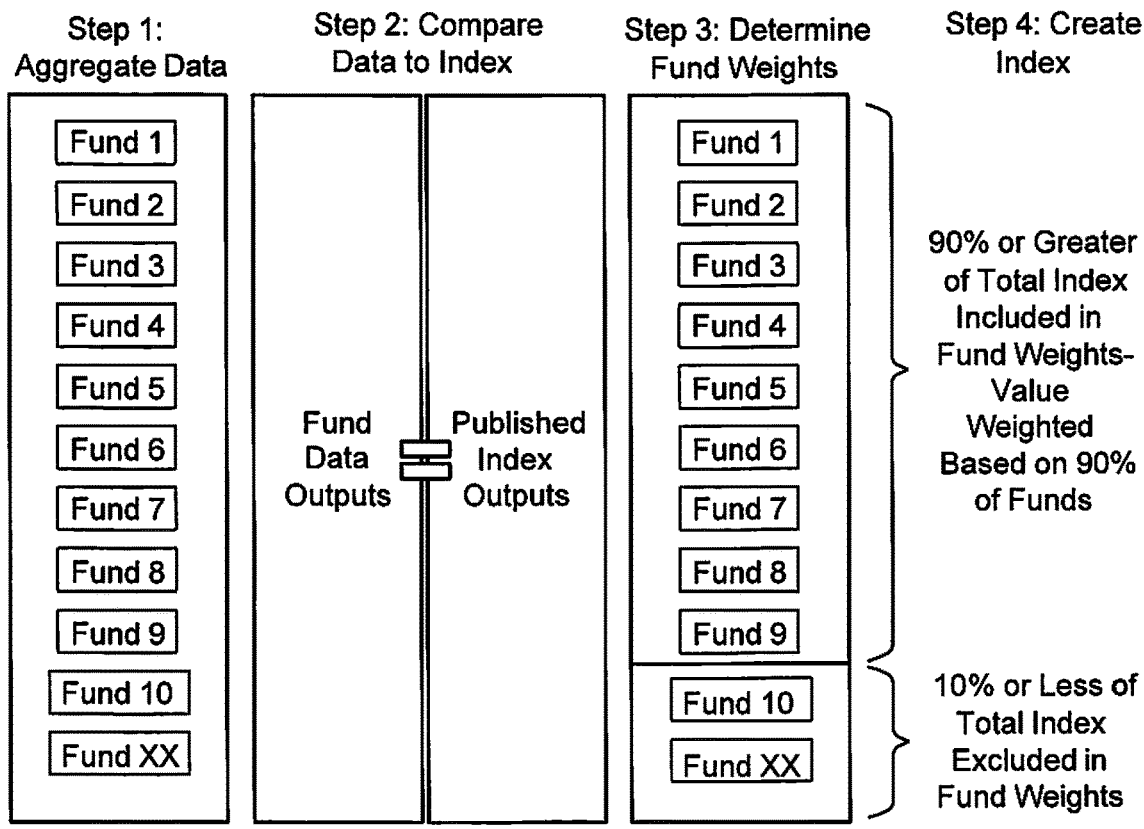
FIG. 1 is an illustration of a system and method that tracks the valuation of a real estate funds (Component Funds) and the targeted weighting of each of the Component Funds of a real estate private index in accordance with the present disclosure.

In general and referring to FIG. 1, at step 1 Component Funds, e.g. Fund 1-Fund XX financial information and all the relevant data is acquired to derive their NAV. The data will then be aggregated to a market net asset value (NAV), which will be compared to that generated by the relevant published market index, at step 2. Once the net asset values are determined, target investment allocations or weightings are determined at step 3, as further described. Statistically, the inventors have determined that over 90% of the weighting matched allocations to Component Funds are preferable in order to maintain minimal tracking error, for example preferably less than 12 basis points. Specifically, given the historical dispersion of the indices, 90% of the matched allocations provide potential outcomes of tracking error ranging from approximately 11 to 22 basis points.

| Cum % of Index | Non Index +/−1.0% | Non Index +/−2.0% |
|---|---|---|
| 10.0% | 8.99% | 17.98% |
| 20.0% | 4.00% | 8.00% |
| 30.0% | 2.33% | 4.66% |
| 40.0% | 1.50% | 3.00% |
| 50.0% | 1.00% | 2.00% |
| 60.0% | 0.67% | 1.33% |
| 70.0% | 0.43% | 0.86% |
| 80.0% | 0.25% | 0.50% |
| 90.0% | 0.11% | 0.22% |
| 100.0% | 0.00% | 0.00% |

The 90% statistical threshold was determined by calculating the statistical probability of tracking error given the historical statistical performance of the index. Specifically, the historical NFI-ODCE data has illustrated that the return dispersion of the index has performed within 1-2%, whereby subsets of managers have been within quartiles breakdowns ranging from 1.3% to 1.9%. Calculation of potential tracking error is made from the return dispersion. The table above describes representative thresholds. As shown, tracking error is over twice as high at the 80% threshold than 90% cumulative holdings. Accordingly, the real estate private index fund of the present disclosure will preferably hold 90% of the NFI-ODCE or greater in order to achieve an acceptable tracking error of less than 12 basis points.

At step 4, a model for the real estate private index fund then calculates the NAV weightings necessary to replicate the index to these statistical specifications. This is done by an algorithm, as may be embodied in a computer program executed by a computer, the steps of which are referenced in FIG. 5 as further described. The algorithm utilizes the Component Fund data to verify the ODCE index data and the manager weightings, in order to derive a desired or preferred statistical threshold for the real estate private index fund.

Figure 5:
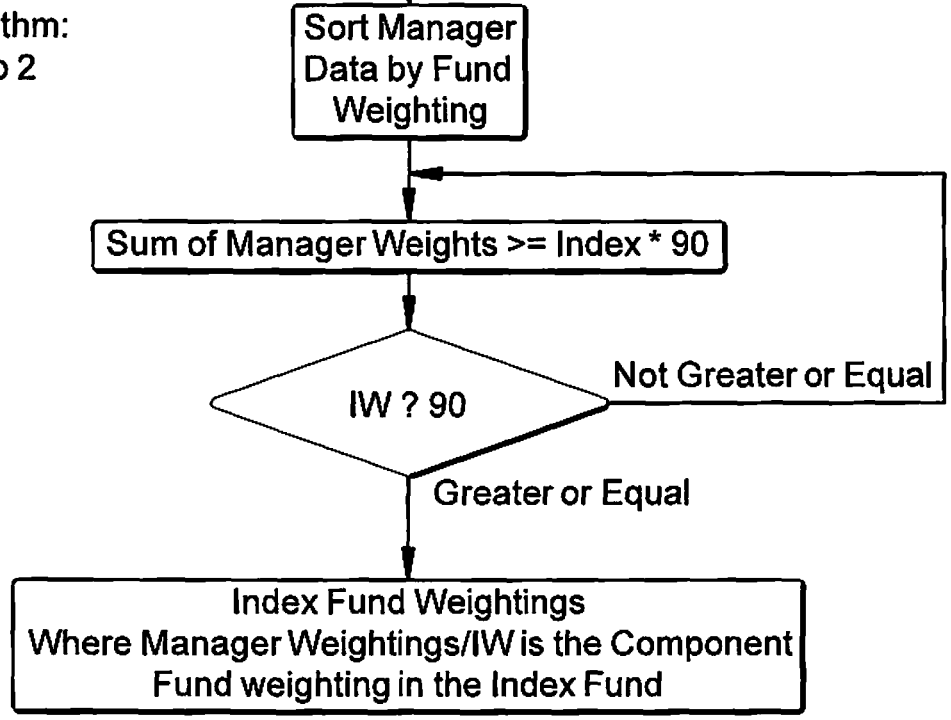
FIG. 5 is a schematic diagram of an algorithm, system and method of the present disclosure that determines the weightings and allocations to achieve a statistical threshold targeted by a real estate private index fund.

Referring to FIG. 5, step 1 of the algorithm entails a forensic accounting analysis at 1-1 to verify that the manager submitted data is accounted for in the same manner as the compilation done by NFI ODCE. The algorithm continues to iterate at 1-2 and verify at 1-3 any differences between what is reported against what was submitted to ensure that all input data is valid and equal to the ODCE Index return at 1-4. In FIG. 5 Step 2, the algorithm uses a logic process at 2-2 that continues to iterate a checksum equation to determine the composition of Component Funds necessary to attain the minimum weighting of 90%. Following this check, the algorithm tests the next largest Component Funds at 2-3 to verify whether they are within a 0.5% index weighting of the prior Component Fund to determine if greater scale should be used in order to track the index, with the final Component Funds creating the actual threshold (the sum being the weightings of all the Component Funds determined to be necessary for index tracking). The algorithm then calculates at 2-4 the targeted weightings for the real estate private index fund by dividing the Component Fund weights by the actual threshold.

However, in this particular case, Component Funds are not traded on an open exchange, and therefore the market for the shares is "illiquid"—meaning there is not enough trading of the particular asset to determine a fair market value. Adding to the complexity of the calculation, these Component Funds may or may not include a performance fee, and/or a hurdle rate. Component Funds may accrue dividends on a periodic (e.g., daily) and pay distributions at the same periodicity or, in other cases, some other period (e.g., quarterly), further affecting cash flow and potential liquidity. The Component Funds may have a minimum capital commitment (e.g., $10 million) and may initially only include marketable securities and cash until real estate properties are purchased or transferred into the fund. Most Component Funds require 30-90 days written notice to contribute or redeem shares at NAV. In order to meet the written request timeframes, the manager will make contributions or distributions of shares and provide written notice to the underlying managers. This will be further described with reference to FIG. 3.

Therefore, the techniques and systems described herein facilitate the quarterly calculation of a NAV for an open-ended, non-exchange traded index fund such that investment advisors and individual investors can purchase and redeem shares at quarterly NAV and receive verifiable and transparent pricing when doing so. In general, the NAV calculation incorporates (1) regular rolling quarterly valuations of the real estate and certain real estate related investments by a valuation agent (who may, in some cases, be independent from the fund and its affiliates), (2) an ongoing valuation assessment of any events that require adjustments to the most recent quarterly valuation, and (3) estimates of accruals for expenses and distributions. Again, in some instances certain valuations and assessments may be performed by the Component Fund managers, whereas in other cases certain valuation responsibilities may be taken on by independent valuation experts or pricing services.

Figure 2:
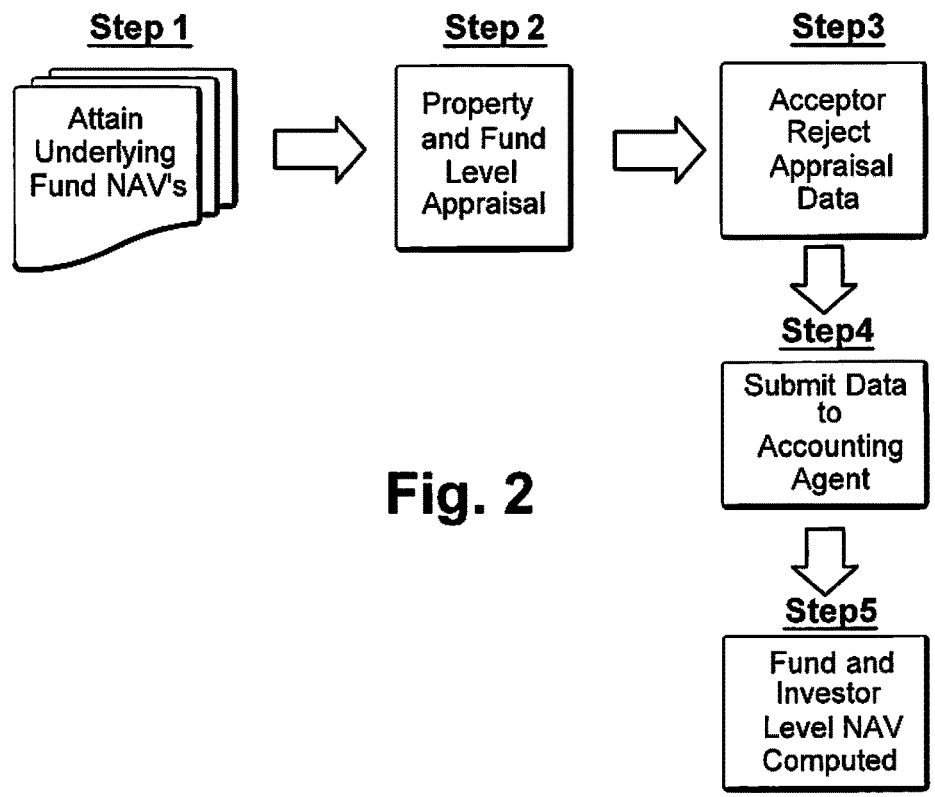
FIG. 2 is a flowchart illustrating a method for calculating share values or net asset values of a real estate private index fund of the present disclosure.

More specifically, and referring to FIG. 2, the fund will purchase Component Fund interests that are valued at a NAV, but will be invested into existing real estate investment portfolios of commercial real estate. Component Funds will be purchased in accordance with the process described above. In the event that Component Funds have an entry queue, investors may be placed into an entrance segregation account ("Entry Segregation Account"). Investors, or their advisors, will be invested in the Segregation Account until the target mix of Component Funds is attained.

At the time a Component Fund is purchased for the fund, a full valuation appraisal of each property and the portfolio is obtained at Step 1 from the Component Funds. The valuation may be obtained by using an independent third-party, or, in some cases, the Component Funds may employ appraisers for such tasks. Thereafter, on a quarterly basis after the first completed calendar quarter following the quarter of the purchase of the property, a periodic valuation update is completed (Step 2). The periodic valuation update provides a basis for estimating the current fair market value of the holdings. The periodic valuation updates are conducted on a rolling basis, such as quarterly. In some instances, the current and interim valuation updates are reported throughout the month to maintain a relatively constant NAV attributable to the real estate sleeve. Interim adjustments may be implemented (Step 3) if extraneous events occur or market conditions change dramatically.

A valuation expert may be engaged to provide the periodic estimates of the market value of the assets, which often includes commercial real estate and notes receivable where the underlying collateral is commercial real estate owned by the Component Fund. The valuation expert may be selected from any number of firms in the business of rendering opinions regarding the value of real estate assets and liabilities, and is provided with access to all information about investments that the valuation expert may deem relevant. The estimates may be performed monthly, quarterly, semi-annually, annually, or virtually any periodicity that is logistically and financially practical. However, in most cases, valuations more frequent that quarterly may be over-burdensome and may not provide significant information to warrant the additional expense.

The valuation expert analyzes the cash flow and other characteristics of each property. Using a discounted cash flow approach to valuation (or other similar cash valuation techniques), the valuation expert analyzes projected cash flows of each property to determine an estimate of the market value of each asset. While a discounted cash flow approach is the principal methodology used in valuation, the valuation expert may also consider, as appropriate, additional valuation methodologies, opinions and judgments, all of which are consistent with industry best practices.

On a quarterly basis the valuation expert also provides an estimate of the market value of notes receivable, primarily relying on a discounted cash flow analysis and an estimate of the market value of mortgages. Quarterly valuations are adjusted between quarters if deemed necessary by the valuation expert, and are immediately reflected in the NAV. As a result, the Component Funds valuation experts are responsible for the estimated market value on an ongoing basis.

The fund accounting agent ("Accounting Agent") calculates the quarterly NAV after the close of quarterly financials by applying (a) the valuations provided by the valuation expert for the Real Estate sleeve, (b) any cash flow items involving contributions, redemptions, and distributions, and (c) the expense accruals of the fund, which principally include accrued distributions, advisory fees and other fund operating expenses (step 4).

The NAV then is determined by dividing the Component Fund's net assets on each quarter by the number of common shares outstanding as of the end of such quarter, prior to giving effect to any share purchases or redemptions to be effected on such quarter (step 5). This valuation process determines the purchase and redemption price per share (per share NAV).

By this process, advisors (on behalf of their clients) and individual investors are able to purchase shares of the fund quarterly at an up-to-date NAV. There is no requirement for an offering period of availability—the fund has perpetual life and is always available for new allocations.

Figure 3:
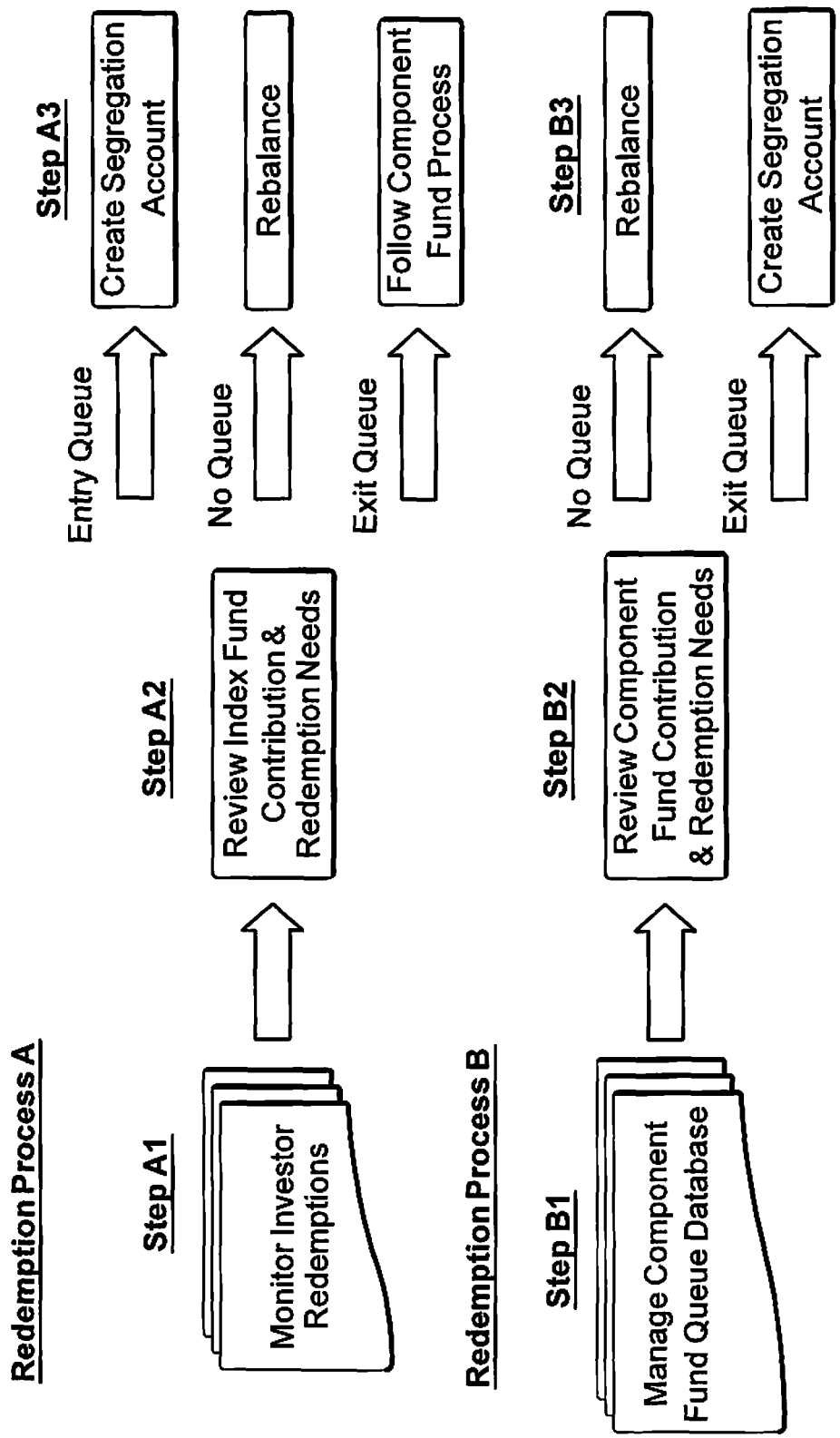
FIG. 3 is a flowchart illustrating a system and method for monitoring and managing contributions and redemptions from real estate investment funds and the real estate private index fund in accordance with the present disclosure.

Referring to FIG. 3, the contribution and redemption process enables advisors to request redemptions on behalf of their clients (or by the investors directly) on a quarterly basis for all or any portion of their shares while considering current market conditions and the liquidity of the fund. In general, the redemption orders are monitored (step A1). Based on the number and size of the redemption orders received, and the current market conditions, a liquidity condition of the fund is determined (step A2). If necessary, redemption caps are imposed upon individual investors based on liquidity conditions and for federal income tax law limits on dividend equivalent redemptions (step A3). The redemptions are then processed at step A3. The process continues with a periodic reevaluation of the redemption orders and liquidity condition. To facilitate redemptions as requested, the fund may operate at all times with sufficient liquidity from cash holdings and proceeds from sales of Component Fund(s) to meet all redemption requests under normal market conditions. More specifically, if the private index fund has an entry queue, as indicated between step A2 and step A3, it may sell the portion owned by the redeeming investors interest to a new investor. This would be done by selling shares from a created segregation account (step A3 Entry Queue). In the event that there are no redemptions, the real estate private index fund will rebalance Component Fund holdings and take no action (step A3 No Queue). In the event of an Exit Queue (step A3 Exit Queue), in the case where the real estate private index fund would not be able to generate liquidity at the index fund level, the real estate private index fund would begin the pricing and redemption process outlined in FIG. 4, as further described.

Referring now to FIG. 3, Redemption Process B, at Step B1 a determination is made whether existing segregation accounts or the real estate private index fund have any outstanding Component Fund exposure. The private index fund would generate a list of existing Component Fund investment needs across the private index fund and Segregation Accounts, which would be reviewed to see if a redemption could be processed without removing commitments from the Component Funds (Step B2). If the positions could be assumed by existing accounts or the private index fund, the Investor would be cashed out via investor rebalancing (Step B3 No Queue). However, if the investor's positions cannot be assumed by other accounts, the private index fund will establish a segregation account and process redemptions at the Component Fund level in order to provide the investor liquidity (Step B3 Exit Queue).

However, exceptional conditions may warrant imposition of more stringent redemption limits. Limitations, if any, may be based on a specified and disclosed percentage of the fund's total net assets just prior to or at the beginning of a calendar quarter or a specified twelve-month period. The specified and disclosed percentage may take into account the level of redemption activity during prior periods. In such cases, all redemption requests are treated equally during a calendar quarter. Investment advisors and/or investors submit redemption requests at any time during the quarter, that is, whenever redemption proceeds may be required by the clients of the advisors or the clients themselves. In some implementations, there is no pro rationing of redemption proceeds, nor is there an order or priority in the treatment of redemption requests.

Only under unusual circumstances may there be further limits in redemption proceeds availability. Such circumstances may be caused by events beyond the control of the fund, such as for example an unexpected market or political event that results in several successive days of large redemptions. As a result of such unusual occurrences, liquidity may be exhausted in a predictable, brief time period such as two or more quarters of similar redemption activity. This is referred to as "Stress Conditions." Under Stress Conditions, an investor may be placed into an exit segregation account ("Exit Segregation Account"). The Exit Segregation Account will impose temporary limits—but not necessarily curtail—redemptions until sufficient liquidity is attained. The Exit Segregation Account may be applied equally to all investor accounts. The Exit Segregation Account may be applied for a brief period, or the remainder of a calendar period (e.g., the rest of the calendar quarter).

In implementation, the Exit Segregation Account determines the maximum number of Component Funds eligible to be redeemed by an investor (the "Cap"), and is set initially on the quarter the Exit Segregation Account is implemented. The Exit Segregation Account is expressed as a percent of the ending share balance in the investor's account on the quarter the segregation account is implemented. Advisors and other interested parties are notified of the Exit Segregation Account on T+1 quarter (and any subsequent adjustments). These communications enable advisors to more predictably forecast redemption proceeds that their clients may be able to receive during the remainder of the calendar quarter.

In a typical asset allocation strategy, an investment advisor or individual investor may look for liquidity sources from the investment portfolio. The Exit Segregation Account provides predictability to the advisor because they are able to forecast the redemption proceeds that are able to be garnered from an investment in the fund during the remainder of the calendar quarter, even under Stress Conditions.

Figure 4:
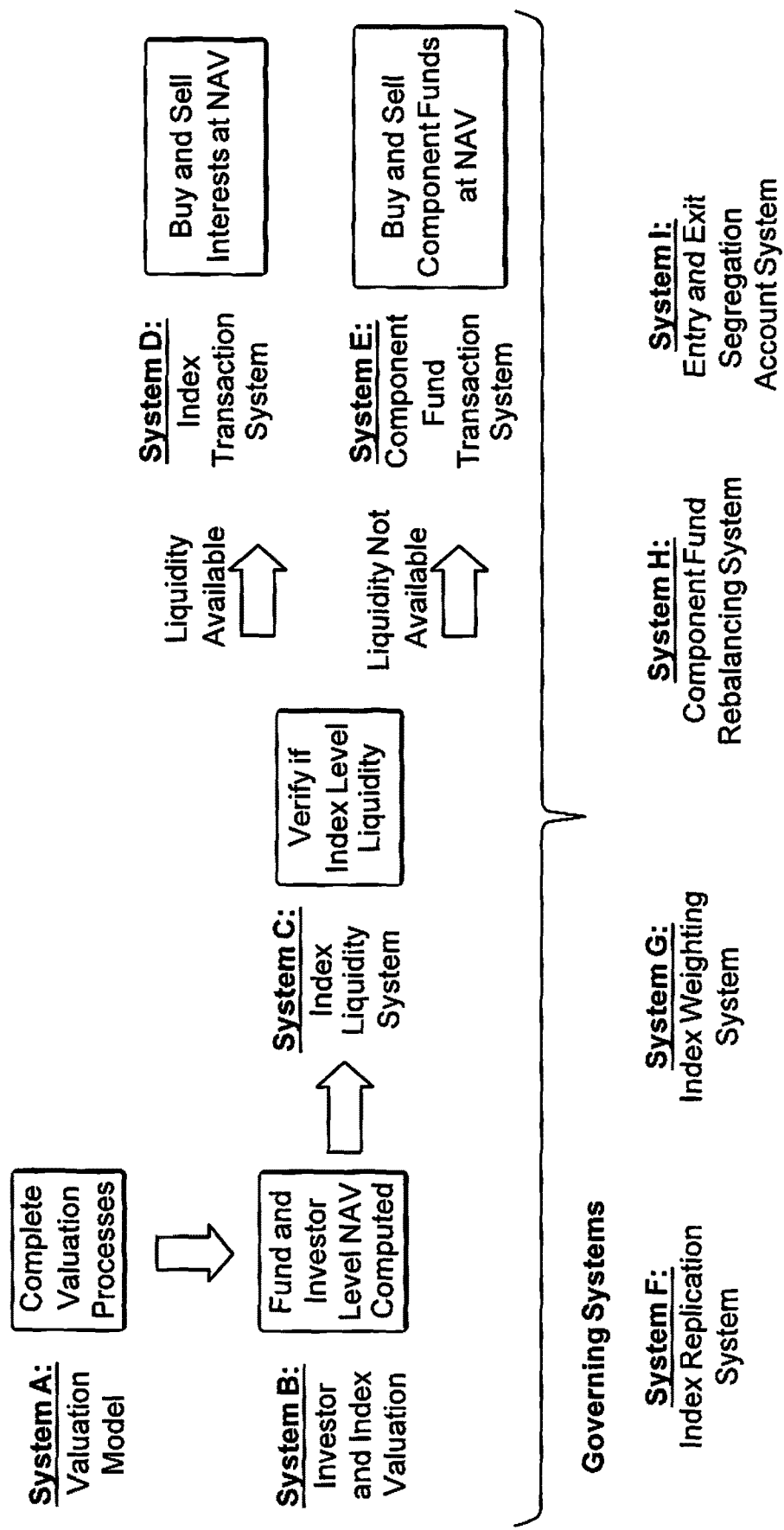
FIG. 4 is a schematic diagram of a system and method for implementing pricing and redemption processes for a real estate private index fund of the present disclosure.

Referring to FIG. 4, the techniques described above may be implemented on one or more hardware computer devices configured and programmed with sufficient memory and processing resources. For example, the client accounting, appraisal, pricing and NAV calculations and purchase and redemption processes may each be implemented as functional modules being executed on one or more servers. An exemplary server comprises hardware CPU(s), operatively connected to hardware/physical memory and input/output (UO) interface. Hardware/physical memory may include volatile and/or non-volatile memory. The memory may store one or more instructions to program the CPU to perform any of the functions described herein. The memory may also store one or more application programs. Separate data storage server(s) may also be used to store client information, investment portfolio information and account information.

Representative Systems A-I for index fund and investor valuation, index fund liquidity, index fund and component fund transactions, index replication, index weighting, rebalancing and entry/exit segregation accounts as set forth in FIG. 4 are described as follows.

A. Valuation Model—This system is intended to examine the net asset values compiled at the Component Fund level to verify that the net asset value is correct and supported by appraisal data. The system will go through various procedures to check the data and ensure that what is reported is as accurate of a reflection of market value. The data in this system is critical to the execution of the various systems.

B. Investor and Index Valuation—The system gathers the Component fund data, post verification from System A, and aggregates the valuation data on total Component Fund basis as well as at the Index Fund Level. The System will provide the data and inputs necessary for System F and System G. These two systems will use the aggregated Component Fund data valuations. Individual investor level valuations will occur by aggregating the pro rata NAV of each Underlying Fund held by the Index Fund. The total NAV will be divided across all of the shares held by the Index Fund, which creates Investor level valuations.

C. Index Liquidity System—As detailed in FIG. 3 and discussed in detail, this system is programmed to examine if there is liquidity at the Index Fund level. The system will determine if the redemption can be resolved with new investors or existing Segregation accounts, utilizing a set of procedures that use a first in, first priority allocation system.

D. Index Transaction System—This subsystem of System C coordinates the transaction and sale of Component Fund and Index Fund interests at NAV. These issues result in no net holdings released from the Index Fund.

E. Component Fund Transaction System—This subsystem of System C calculates the pro rata share of each Component Fund held by an Index Fund investor and will determine the amount of capital to be redeemed by each Component Fund. It will output specific amounts that will be used by the Index Fund portfolio manager to rebalance the Index Fund.

F. Index Replication System—The system utilizes the ODCE replication algorithm specified in FIG. 5, Algorithm Step 1. The system will gather the data and iterate algorithm to verify that the index has effectively been replicated in order to provide the necessary input data for System G.

G. Index Weighting System—The system utilizes the ODCE replication algorithm specified in FIG. 5, Algorithm Step 2. The system will process the iterations as specified, first verifying the 90% threshold is maintained, then verifying that the next largest Component Funds is no less than 25% of the smallest included Component Fund. The system will include the Fund that meets these criteria and will set the basis for rebalancing targets.

H. Component Fund Rebalancing System—This system will feed off the data in System G and will generate the specific amount of NAV that the Index Fund would optimally choose to be invested. The system will calculate the Index Fund redemption and contribution requirements and deliver a set of rebalancing targets for the Index Fund portfolio manager.

I. Entry and Exit Segregation Account System—The system is designed to use the data in System C, D, E, and H and manages the transaction of Component Funds among the Entry and Exit Segregation accounts. The system will use the first in, first priority allocation system and will invest capital to the Index Fund from the oldest Entry segregation accounts and will redeem capital first from the oldest Exit segregation accounts.

The processes and functions may be allocated to one or more computational modules that are implemented as computer-determined reallocations on the server. For example, a client accounting module may be used to manage the funds associated with each individual investor and invested in any particular investment vehicle. The purchase and redemption processes may be implemented by a purchase and redemption module, which determines any caps and monitors purchase and redemption orders, in addition to other transactions. A pricing module determines the total value for the fund (or funds) based on the values of the underlying assets and the NAV based on the number of outstanding shares. The system may also include an appraisal valuation module to facilitate the calculation and storage of appraisal and valuation information regarding the underlying real estate assets.

Although in the examples provided herein the modules may reside on a single server, it should be appreciated that the functionality of the modules and components can be implemented on any larger number of computers or on a computer network. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more compact discs, optical discs, magnetic tapes, flash memories, or other semiconductor devices, servers or other tangible computer storage medium of a computer or accessed by a computer network) encoded with one or more programs and models that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

One skilled in the art will realize the invention may be embodied in other specific forms without departing from the spirit or essential characteristics thereof. The foregoing embodiments, together with the attached exhibits, are therefore to be considered in all respects illustrative rather than limiting of the invention described herein.

What is claimed is:

1. A method of creating and managing investment in a real estate private index fund (REPIF) that replicates an open end, unlisted, private, transparently-reported real estate index (OUPTREI) within a desired tracking error using investment in fewer than all of the component funds of the OUPTREI, the method comprising the steps of:

(a) identifying, using an index replication system residing on a computer or computer network, the computer or computer network comprising a processor, a plurality of unlisted transparently-reported real estate investment funds available for individual investment and which allow for investment income to be reinvested for rebalancing, said plurality of unlisted, transparently-reported real estate investment funds consisting of component funds in the OUPTREI, and storing data relating to the identified component funds in computer memory;

(b) the processor selecting, from the stored data relating to the identified component funds in computer memory, a subset of the plurality of the identified component funds corresponding to a predetermined minimum percentage of weighting matched allocations of all of the component funds in the OUPTREI, the predetermined minimum percentage selected as a function of the maximum desired tracking error and return dispersion of the OUPTREI based upon historical statistical performance of the OUPTREI, wherein selecting the subset includes implementing a replication algorithm that includes the steps of:

(i) the processor sorting the plurality of component funds by fund weighting, then (ii) the processor iteratively adding funds to the subset, proceeding from higher to lower weightings, until a sum of the weighting matched allocations of the component funds in the subset is greater than the predetermined minimum percentage of the weighting matched allocations of all of the component funds in the OUPTREI, then (iii) the processor continuing to iteratively evaluate funds for adding to the subset, proceeding from higher to lower weightings, and only adding a fund that has a weighting matched allocation greater than a predetermined percentage of a weighting matched allocation of a next largest component fund in the subset; and (iv) the processor storing data relating to the subset in computer memory;

(c) the processor determining, by accessing the stored data relating to the subset in computer memory, a per share net asset value for each of the selected subset of component funds (CF NAV) by dividing a value for net assets of each by a corresponding number of common shares and storing the CF NAV in computer memory, wherein the value for net assets comprises valuation data verified by an independent valuation expert as providing an accurate reflection of market value;

(d) the processor calculating weightings for each of the selected subset of funds to accurately track the OUPTREI, and storing the weightings in computer memory;

(e) the processor rebalancing, by accessing the stored weightings in computer memory, the weightings of the selected subset of funds periodically in order to track the OUPTREI with a tracking error in a range of 11 to 22 basis points, storing the rebalanced weightings in computer memory, establishing rebalancing needs of the REPIF based upon the rebalanced weightings, and storing the rebalancing needs of the REPIF in computer memory;

(f) the processor executing purchases or positions in the selected subset of component funds in correspondence to the weightings, and issuing shares in the REPIF to shareholders in accordance therewith;

(g) the processor periodically determining a net asset value of the real estate private index fund (REPIF NAV) based upon a total net asset value of the REPIF and number of outstanding shares, and storing the REPIF NAV in computer memory;

(h) the processor determining a liquidity condition of the REPIF and storing a related liquidity condition indicator in computer memory;

(i) the processor executing redemptions and contributions to the REPIF, comprising the substeps of:

(I) the processor matching requested contributions with requested redemptions on a first-in-first-out basis from an exit segregation account established in computer memory and an entry segregation account established in computer memory, without liquidating fund positions in the selected subset of funds held by the REPIF;

(II) to the extent the requested redemptions exceed the requested contributions, or vice versa, and:

(A) if the liquidity condition indicates liquidity is available in the REPIF, the processor executing requested redemptions and requested contributions at REPIF NAV from the REPIF, and (B) if the liquidity condition indicates liquidity is not available in the REPIF, the processor executing requested redemptions and requested contributions from the subset of component funds at CF NAV in accordance with the stored rebalancing needs of the REPIF accessed by the processor; and (C) to the extent requested redemptions remain unmatched, the processor determining and sending a notification communication to each investor regarding a maximum number of component funds eligible to be redeemed by that investor during a predetermined period.

2. The method of claim 1 further comprising the step of calculating, by use of the computer or computer network, amounts of capital required for the unlisted real estate funds required to maintain the unlisted real estate index weightings and an amount of capital necessary for redemptions from the unlisted real estate funds.

3. The method of claim 1 further comprising the step of creating and applying, by use of the computer or computer network, a redemption cap on redemptions of interests in the real estate private index fund.

4. The method of claim 1 further comprising the steps of: calculating by use of the computer real estate pricing data of real estate assets held by the selected set of funds based on a periodic appraisal of the real estate assets held by the selected set of funds, and combining, by use of the computer or computer network, the real estate pricing data with pricing data related to liquid securities held by the selected set of funds for determination of the net asset value for each of the selected set of funds.

5. The method of claim 1, wherein the predetermined minimum percentage is 90%, and the maximum desired tracking error is 12 basis points.

6. The method of claim 1, wherein the predetermined percentage of the weighting matched allocation of the next largest component in (b)(iii) is 25%.

7. The method of claim 5, wherein the predetermined percentage of the weighting matched allocation of the next largest component in (b)(iii) is 25%.

8. A computer program product embodied on a non-transitory computer accessible medium comprising machine readable instructions which when executed by a processor causes the processor to perform a method of creating and administering a real estate private index fund (REPIF) that replicates an open end unlisted, private, transparently-reported real estate index (OUPTREI) within a desired tracking error using investment in fewer than all of the component funds of the OUPTREI by the steps of:

identifying the OUPTREI;

identifying a plurality of unlisted, transparently-reported real estate investment funds available for individual investment and which allow for investment income to be reinvested for rebalancing, said plurality of unlisted, transparently-reported real estate investment funds consisting of component funds of the OUPTREI, and storing data relating to the identified component funds in computer memory;

selecting a subset of the plurality of the identified component funds corresponding to a predetermined minimum percentage of weighting matched allocations of all of the component funds in the OUPTREI, the predetermined minimum percentage selected as a function of a maximum desired tracking error and return dispersion of the OUPTREI based upon historical statistical performance of the OUPTREI, wherein selecting the subset includes implementing a replication algorithm that includes the steps of:
  (i) sorting the plurality of component funds by fund weighting, then
  (ii) iteratively adding funds to the subset, proceeding from higher to lower weightings, until a sum of the weighting matched allocations of the component funds in the subset is greater than the predetermined minimum percentage of weighting matched allocations of all of the component funds in the OUPTREI, then
  (iii) continuing to iteratively evaluate funds for adding to the subset, proceeding from higher to lower weightings, and only adding a fund that has a weighting matched allocation greater than a predetermined percentage of a weighting matched allocation of a next largest component fund in the subset, and
  (iv) storing data relating to the subset in computer memory;

determining a per share net asset value for each of the selected subset of component funds by dividing a value for net assets of each by a corresponding number of common shares (CF NAV), and storing the CF NAV in computer memory, wherein the value for net assets comprises valuation data stored in computer memory and verified by an independent valuation expert as providing an accurate reflection of market value;

weighting each of the selected subset of funds to accurately track the OUPTREI and storing corresponding weightings in computer memory, the selected and weighted subset of real estate investment funds forming the REPIF;

investing in the REPIF, including purchasing positions in the selected subset of component funds in correspondence to the weightings and issuing shares in the REPIF to shareholders in accordance therewith;

periodically determining a net asset value of the real estate private index fund (REPIF NAV) based upon a total net asset value of the REPIF and number of outstanding shares; and rebalancing the weightings the selected subset of funds periodically in order to track the unlisted, transparently-reported real estate index with a tracking error in a range of 11 to 22 basis points, storing the rebalanced weightings in computer memory, establishing rebalancing needs of the REPIF based upon the rebalanced weightings, and storing the rebalancing needs of the REPIF in computer memory; and determining a liquidity condition of the REPIF;

executing redemptions and contributions to the REPIF, including matching requested contributions in an entry segregation account established in computer memory with requested redemptions in an exit segregation account established in computer memory, on a first-in-first-out basis, without liquidating fund positions in the selected set of funds held by the REPIF, and if requested redemptions exceed requested contributions, or vice versa:
  if the liquidity condition indicates liquidity is available in the REPIF, executing requested redemptions and requested contributions at REPIF NAV from the REPIF, and
  if the liquidity condition indicates liquidity is not available in the REPIF, executing requested redemptions and requested contributions from the subset of component funds at CF NAV in accordance with rebalancing needs of the REPIF as stored in the computer memory, and to the extent requested redemptions remain unmatched, the processor determining and sending a notification communication to each investor regarding a maximum number of component funds eligible to be redeemed by that investor during a predetermined period.

9. The computer program product of claim 8, wherein the predetermined minimum percentage is 90%, and the maximum desired tracking error is 12 basis points.

10. The computer program product of claim 8, wherein the predetermined percentage of the weighting matched allocation of the next largest component in (iii) is 25%.

11. The computer program product of claim 8, further comprising a one or more computational modules, each comprising machine-readable language executed by the processor to cause the processor to perform, the computational modules including: a Valuation Model configured to examine and verify the CF NAV; an Investor and Index Valuation system configured to gather component fund data, post verifications from the Valuation Model, and aggregate valuation data on a total component fund basis as well as at an REPIF level; an Index Liquidity System configured to determine the liquidity condition; an Index Transaction System configured to coordinate transactions of component fund and REPIF interests with releasing net holdings from the REPIF; a Component Fund Transaction System configured to use data generated by the Investor and Index Valuation system to calculate a pro rata share of each component fund held by an investor, to determine an amount of capital to be redeemed by each component fund, and to output values for use in rebalancing; an Index Replication System configured to use data generated by the Investor and Index Valuation system and, in conjunction with an Index Weighting System configured to set weightings, perform the steps of identifying the plurality of unlisted, transparently-reported real estate investment funds and selecting the subset of component funds; a Component Fund Rebalancing System configured to receive output from the Index Weighting System, to calculate Index Fund redemption and contribution requirements and to deliver a set of rebalancing targets; and an Entry and Exit Segregation Account System configured to use the data generated by the Index Liquidity System, the Index Transaction System, the Component Fund Transaction System, and Component Fund Rebalancing System to manage the transaction of component funds between the entry segregation account and the exit segregation account.

12. The computer program product of claim 9, wherein the predetermined percentage of the weighting matched allocation of the next largest component in (iii) is 25%.

\* \* \* \* \*